A. OWEN.
VEHICLE WHEEL.
APPLICATION FILED MAY 1, 1915.

1,222,981.

Patented Apr. 17, 1917.

Witnesses:

Inventor:
Arthur Owen.
by
Attorney.

UNITED STATES PATENT OFFICE.

ARTHUR OWEN, OF PENDLETON, ENGLAND.

VEHICLE-WHEEL.

1,222,981.  Specification of Letters Patent.  Patented Apr. 17, 1917.

Application filed May 1, 1915. Serial No. 25,265.

*To all whom it may concern:*

Be it known that I, ARTHUR OWEN, a subject of the King of Great Britain and Ireland, and resident of Pine street, Broad street, Pendleton, in the county of Lancaster, England, have invented certain new and useful Improvements in Vehicle-Wheels, of which the following is a specification.

This invention relates to wheels for motor cars and like vehicles and has for its object to provide improved means for detachably securing wheels or wheel rims in position.

My invention comprises the provision in a wheel having fixed and detachable parts and a locking plate, of the improved locking and driving means hereinafter described and claimed.

Referring to the accompanying sheet of explanatory drawings:—

The same reference letters in the different views indicate the same parts.

The wheel axle $a$ is provided with a boss or hub like part $b$ thereon having a plate or disk $c$ at its inner end. The boss is provided with three keys $d$ having projecting heads $e$. The detachable portion $f$ of the wheel has slots therein corresponding in size with the projecting heads on the keys, the latter providing the driving connection between the fixed and detachable portions. When the detachable portion has been placed in position against the disk $c$, a locking plate $g$ having slots $h$ therein and also inclines $i$ between the slots, is passed over the projecting heads $e$ and given a partial turn so as to cause the inner face of the heads $e$ to engage the inclines and thereby hold the detachable part $f$ of the wheel firmly in place. The catch piece $j$, which has been held in its out-of-service position against the pressure of the spring $k$, is now allowed to engage the teeth upon the periphery of the locking plate so as to prevent accidental displacement of same. A cap $m$ fits over the end of the wheel hub and covers the locking plate and coöperating parts.

Figure 1:
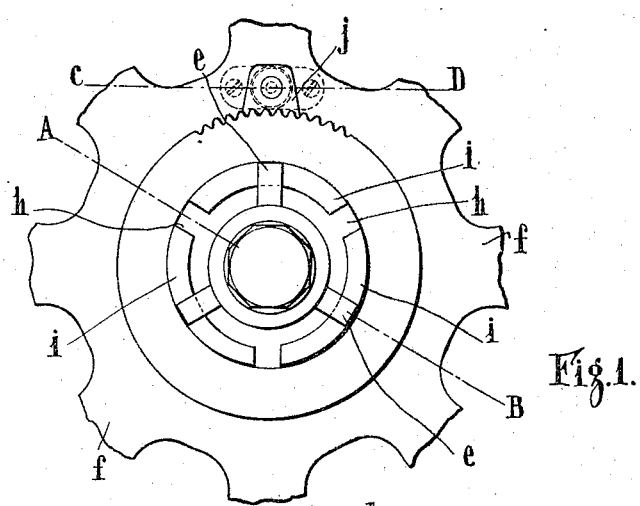
Figure 1 is an end elevation of part of a wheel having my invention applied thereto in one convenient form.
Figure 2:
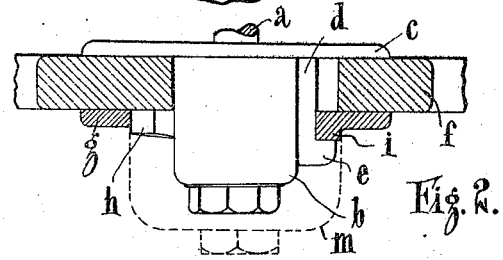
Fig. 2 is a sectional plan view on the line A B of Fig. 1 and Fig. 3 a similar view on the line C D of the same figure.
Figure 3:
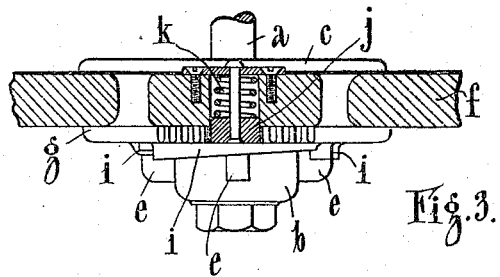

It will be readily understood that the form of my invention illustrated at Figs. 1 to 3 may be applied to a wheel having a detachable rim, the keys $d$ passing through the rim when it is placed in position and a locking plate similar to $g$ being employed. A catch piece prevents displacement of the locking plate.

I do not limit myself to any particular form of catch piece but may modify the same to suit requirements.

By the employment of my invention it is possible to place the wheel into and remove it from position without the employment of tools. I may, if desired, provide tommy holes in the locking plate $g$ to assist in turning same into and out of position.

Having now described my invention what I claim as new and desire to secure by Letters Patent is:—

1. In a vehicle wheel, in combination, a fixed part, keys having radially projecting heads upon said fixed part, a detachable part slotted to pass over said keys and their projecting heads, a locking ring or annulus of sufficient internal diameter to pass over said keys but not their heads, slots in said locking ring to pass over the key heads, inclines upon said locking ring extending between said slots to engage the key heads upon a partial rotation of the ring, and securing means for said locking ring, as set forth.

2. In a vehicle wheel, the combination with a fixed part, and keys having radially projecting heads upon said fixed part, of a detachable part slotted to pass over said keys on to the fixed part, a locking ring of sufficient internal diameter to pass over said keys but not their heads, slots in said locking ring to pass over the key heads, inclines on said locking ring extending between the slots and engaging the key heads upon a partial rotation of the ring, and a catch piece engaging the locking ring, as set forth.

3. In a vehicle wheel, in combination the wheel axle, a boss like part fixed thereon, keys on said boss having radially projecting heads, a detachable part forming the wheel proper slotted to pass over said keys and their heads on to the boss, a disk limiting the movement of the detachable part over said boss, a locking ring of sufficient internal diameter to pass over said keys, slots in said ring to pass over said key heads, inclines between the slots on said locking ring, said inclines engaging the key heads upon a partial rotation of the ring, a catch piece engaging the locking ring and a cap inclosing the locking means, as set forth.

In testimony whereof I have signed my name to this specification in the presence of two subscribing witnesses.

ARTHUR OWEN.

Witnesses:
 ARTHUR HUGHES,
 HILDA HUGHES.

Copies of this patent may be obtained for five cents each, by addressing the "Commissioner of Patents, Washington, D. C."